United States Patent Office 2,946,795
Patented July 26, 1960

2,946,795
APOMORPHINIUM SALTS

Bernard Rudner, Pittsburgh, Pa., assignor to W. R. Grace & Co., New York, N.Y., a corporation of Connecticut No Drawing. Filed Aug. 18, 1958, Ser. No. 755,421

5 Claims. (Cl. 260—285)

This invention relates to quaternary nitrogenous salts. In one specific aspect, it relates to apomorphinium salts which may be called N-aminoapomorphinium compound.

It is an object of the present invention to provide a new generic class of compounds having useful pharmaceutical properties.

The compounds of my invention are conveniently prepared by the action of chloramine on the appropriate tertiary amine. In the preferred practice of this invention, the reactant tertiary amine dissolved in an unreactive solvent is exposed to a stream of gaseous chloramine. The resultant N-aminoapomorphinium chloride is isolated by conventional laboratory techniques. Compounds containing anions other than chloride are prepared by metathesis starting with the chloride and a compound containing the anion to be introduced.

In accordance with the present invention, I have made available a new class of apomorphinium salts having the general formula:

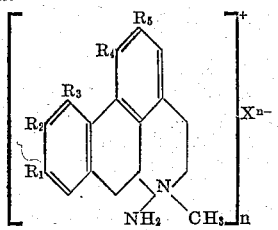

In the above formula $R_1$, $R_2$, $R_3$, $R_4$ and $R_5$ are each selected from the group consisting of hydrogen, hydroxyl and lower alkoxy. In addition $R_4$ and $R_5$ may be considered together to form the divalent —$OCH_2O$— radical. X is an anion having the charge $n$; $n$ is also the number of cations required to balance the anionic charge.

When my compounds are used for pharmaceutical purposes, X must be a pharmaceutically acceptable anion. The primary attributes of such an anion are nontoxicity and pharmaceutical compatability. Otherwise, the choice of the anion is of little consequence, since the primary activity of my novel compounds resides in the cation. The salts obtained by variation of the anion may in some cases have special advantages due to solubility, ease of crystallization, lack of objectionable taste and the like, but these considerations are all subsidiary to the characteristics of the cation which are independent of the character of the anion. Hence all variations of X are considered equivalent for the purpose of the present invention. Specific, but non-limiting, variants of X are as follows: chloride, bromide, iodide, sulfate, bisulfate, acetate, salicylate, valerate, oleate, phenate, laurate, borate, benzoate, lactate, nitrate, diglycolate, phosphate, phenylethylbarbiturate, o-acetoxybenzoate, citrate, dialkylbarbiturate, sulfathiazole, theophyllinate, urate, maleate, fumarate, succinate, tartrate, diethylbarbiturate, penicillinate, camphorate, salicylamine, diphenylhydantoin, carbonate, cacodylate, aconitate, sulfamate, gentisate, malate and the like.

One method of preparing the novel compounds of my invention is to react chloramine with the tertiary amine corresponding to the desired hydrazinium compound; the product is isolated and purified by standard laboratory techniques. Since many of the amines are commercially available as their salts, the hydrochloride being the most common, it has been found convenient to treat aqueous solutions of the amine salts with base and extract the free amine with a solvent such as chloroform. After treatment of the extract with a conventional drying agent, the solution is ready for chloramination. While chloramine is most advantageously prepared as a gaseous chloramine-ammonia mixture obtained from a generator constructed according to the teachings of Sisler et al., U.S. Patent 2,710,248, other methods are equally adaptable for the purpose of the present invention. For instance, chloramine can be made by reacting chlorine with an excess of ammonia in carbon tetrachloride or similar halogenated solvents under controlled conditions of mixing at low temperatures. Such a process is fully described in U.S. Patent 2,678,258 to John F. Haller. Another effective procedure is that of Coleman et al. fully described in Inorganic Syntheses, vol. I, 59 (1939). Alternatively, the chloramine can be formed in the presence of the amine as described in the copending application Serial No. 605,230, filed August 20, 1956, which teaches the reaction of chlorine and a tertiary amine in the presence of excess ammonia. For simplicity, when both the amine and the product are soluble in the same inert solvent, e.g., chloroform, chloramine may be formed in situ by this method right in the solution containing the reactant tertiary amine. In general, the choice of solvent is one of economy and simplicity. When preformed chloramine is used and good absorption is required for efficient reaction, it has been found desirable to bubble chloramine through a long column of a solution comprising the tertiary amine dissolved in relatively cheap inert solvent. By inert solvent it is meant a solvent unreactive under the condition of the reaction. Solvents which serve this purpose include hydrocarbons, e.g., heptane, cyclohexane, benzene, xylene and the like; ethers e.g., diethyl ether, diamyl ether, dioxane and anisole; amides, e.g., dimethylformamide and dimethylacetamide; halohydrocarbons, e.g., chloroform, carbon tetrachloride, trichloroethylene and chlorobenzene; nitroaromatics, e.g., nitrobenzene. For special purposes, water and other hydroxylic solvents such as ethyl alcohol and Cellosolve may be used. When the reaction is conducted in anhydrous solution, the product often precipitates as the reaction progresses. In aqueous solution, however, it is usually necessary to concentrate or to evaporate to dryness in order to isolate the product.

Another method of preparing the novel compounds of my invention is the reaction of hydroxylamine-o-sulfonic acid with tertiary amines which produces the hydrazinium sulfate corresponding to the tertiary amine used. Preferably the appropriate tertiary amine and hydroxylamine-o-sulfonic acid are allowed to react or are heated together in the presence of an alcoholic solvent but excess amine or other suitable solvents may be used. Even though the use of a solvent is not required, superior results are obtained with a solvent because of the extremely exothermic reaction that quite often results. A frequent purification step is the treatment of the reaction mixture with a basic substance such as sodium carbonate to remove acidic constituents from the product hydrazinium sulfate which is essentially neutral and stable to the action of base. Further purification is effected by standard laboratory techniques.

It is obvious that not all of the novel hydrazinium compounds of my invention are capable of being prepared directly as shown above. In order to provide the other useful salts of the present invention, it is necessary to prepare the compounds containing anions other than chloride or sulfate by metathesis. Many of the anions described supra can be obtained by mixing aqueous solutions of the hydrazinium chloride with appropriate reagents. More often than not, the desired product precipitates directly as the reaction progresses. This is the case where the new salt being formed is less soluble or insoluble in water. Other metathetical approaches are available and the method selected depends on experimental convenience, costs of reagents and the differences in physical properties between the product and the starting material to be utilized in their separation. Reaction of a hydrazinium halide with a soluble silver salt, such as silver nitrate, results in the precipitation of silver halide and the formation of the hydrazinium nitrate. In an analogous manner, treatment of the sulfate with a soluble barium salt results in the precipitation of barium sulfate and conversion to the anion of the barium salt. Quite often the appropriate reactants are heated together in the absence of a solvent and the product isolated by standard laboratory techniques. Another approach independent of the formation of an insoluble solid, is to react the halide with an excess of the desired anion as its acid; hydrogen halide is evolved as the new salt is formed. When it is necessary to prepare a very soluble salt, the reaction of the hydrazinium hydroxide with equivalent amounts of the appropriate acid may be utilized; this approach is also used for the preparation of very pure compounds. (Subjecting a hydrazinium halide to the action of moist silver oxide will give the hydrazinium hydroxide.)

Suitable starting amines for the practice of my invention include apomorphine, apocodeine, morphothebaine, boldine, corydine, corytuberin, glaucine, bulbocapnine, dicentrine and laureline. The above amines are naturally occurring alkaloids such as corydine or are synthesized from naturally occurring alkaloids such as apomorphine from morphine. These amines form a structurally coherent group. Location and state of etherification of the phenolic hydroxyl groups accounts for the variation in structure but the nature of the pharmacological effects of my novel compounds appear to be very similar.

The scope and utility of my invention is further illustrated by the following examples:

Example I

Twenty grams of apomorphine hydrochloride was suspended in 600 ml. of chloroform and a stream of gaseous ammonia was bubbled through the reaction mixture for 30 minutes to give a solution of the free base and insoluble ammonium chloride. Using the chloramine generator previously discussed, a stream of gaseous chloramine made from 20 g. of chlorine and excess ammonia was passed into the efficiently stirred reaction mixture. Stirring was continued overnight. Filtration gave 38.3 g. of a green residue which was a mixture of ammonium chloride, unreacted amine and N-aminoapomorphinium chloride. The product was isolated and purified by solution in dimethylformamide, filtration from insoluble material and addition to a ten volume excess of chloroform. Repetition of this procedure starting with 15 g. of the crude product gave 11 g. of light green N-aminoapomorphinium chloride which softened at 182° C. and melted at 192° C. Its structural formula is shown below:

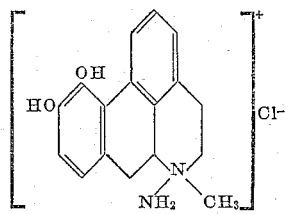

Example II

Boldine crystallizes from chloroform as a molecular complex with one mole of the solvent. To 400 mg. of this complex (about 300 mg. of boldine) dissolved in 20 ml. of ethyl alcohol there was added 120 mg. of hydroxylamine-o-sulfonic acid dissolved in 20 ml. of methyl alcohol. After boiling the reaction mixture for 25 minutes and allowing it to stand overnight, the resultant precipitate of 100 mg. of N-aminoboldinium sulfate was isolated by filtration. The product melted with decomposition above 220° C. and was insoluble in chloroform and cold alcohols but soluble in water and hot alcohols. It has the following structural formula:

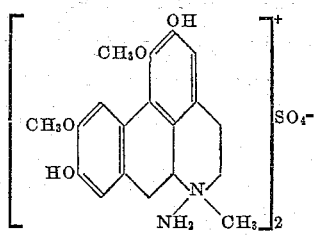

Examples III and IV

N-aminoapomorphinium chloride was suspended in physiological saline at a concentration of 20 mg./ml. and administered intraperitoneally to unstarved male albino mice at doses of 75, 100, 150 and 200 mg./kg. The acute intraperitoneal $LD_{50}$ at 48 hours appears to be approximately 100 mg./kg.

A mongrel male dog weighing 6.2 kg. was anesthetized by the intraperitoneal administration of 100 mg./kg. of phenobarbital sodium and surgery was supported with intravenous pentobarbital sodium. The carotid artery was cannulated and connected to a mercury manometer for recording blood pressure and a Pfeiffer cannula was inserted into the trachea and connected to a Marey tambour for recording respiration. A femoral vein was exposed for the introduction of test material. N-aminoapomorphinium chloride was dissolved in physiological saline at concentrations of 1.0 and 5.0 mg./ml. Doses of 0.05, 0.25, and 1.25 mg./ml. were administered intravenously to the dog over a period of approximately 90 minutes causing moderate but transient falls in blood pressure with no other significant changes. There was no significant effect on the blood pressure responses to epinephrine, norepinephrine, acetylcholine, histamine or nicotine during the study.

I claim:

1. New chemical compounds having the general formula:

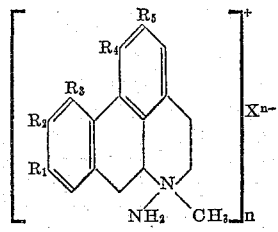

wherein $R_1$, $R_2$, $R_3$, $R_4$ and $R_5$ are members independently selected from the group consisting of hydrogen, hydroxyl and lower alkoxy; $R_4$ and $R_5$ considered together form the divalent —$OCH_2O$— group; X is a pharmaceutically acceptable anion; and n is an integer less than four.

2. Compounds according to claim 1 wherein $R_1$, $R_4$, and $R_5$ are hydrogen, $R_2$ and $R_3$ are hydroxyl and X is halide.

3. Compounds according to claim 1 wherein $R_1$ and $R_5$ are hydroxyl, $R_2$ and $R_4$ are lower alkoxy, $R_3$ is hydrogen and X is sulfate.

4. As a new chemical compound, N-aminoapomorphinium chloride.

5. As a new chemical compound, N-aminoboldinium sulfate.

No references cited.